April 16, 1940.  W. S. GRAHAM ET AL  2,197,429
BASIN PLANTING ATTACHMENT
Filed April 26, 1937  2 Sheets-Sheet 2
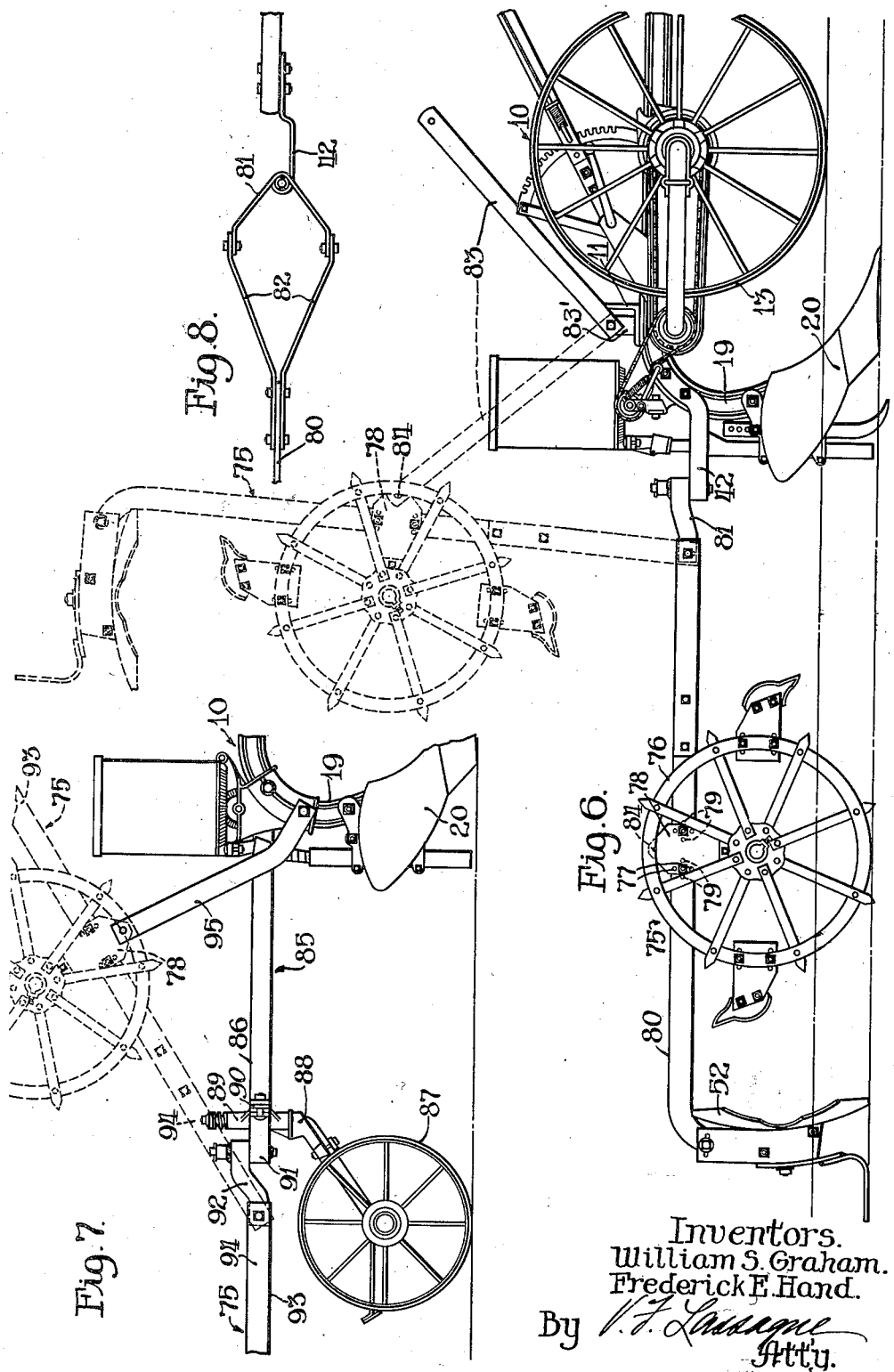
Inventors.
William S. Graham.
Frederick E. Hand.
By
Att'y.

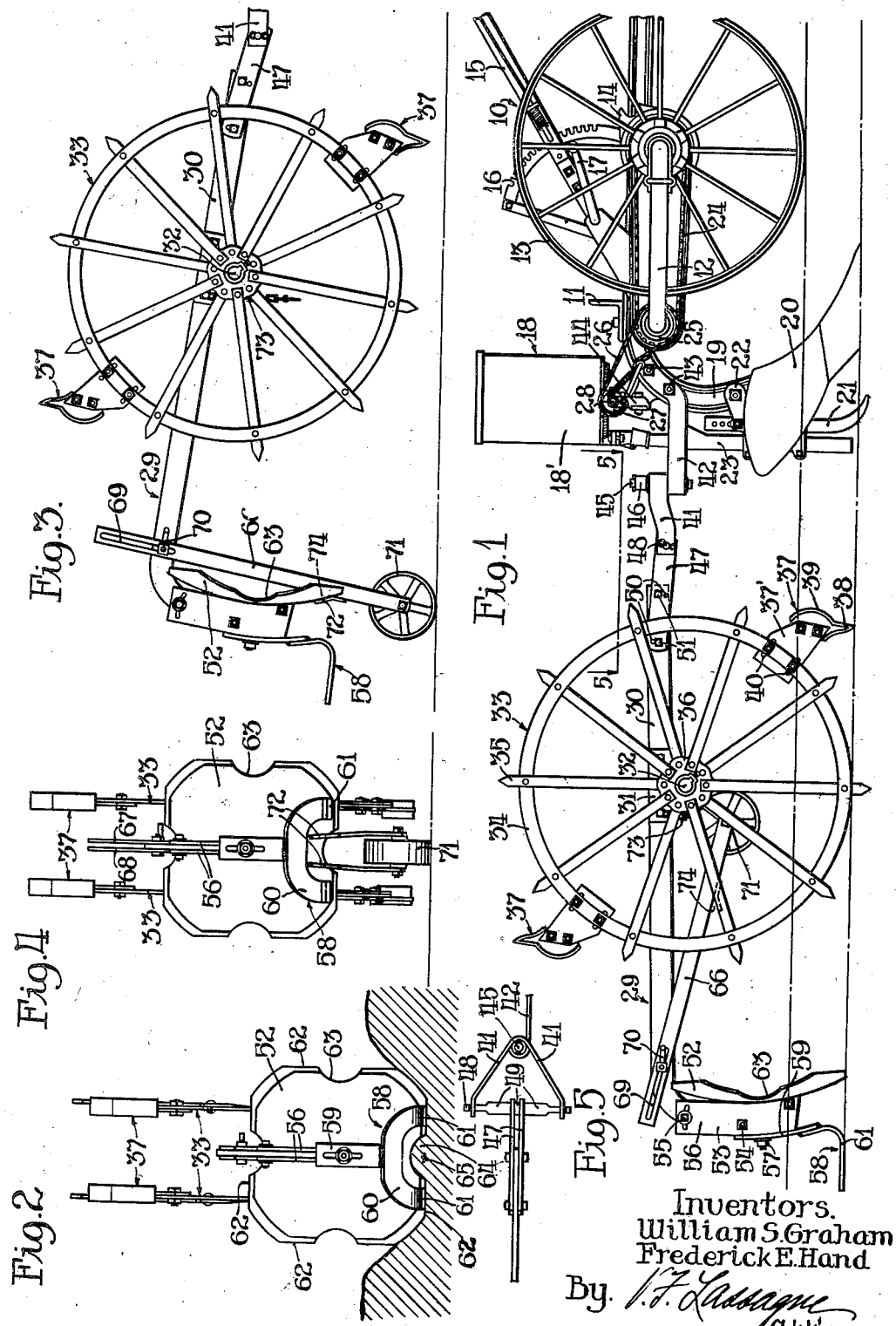

Patented Apr. 16, 1940

2,197,429

UNITED STATES PATENT OFFICE 2,197,429

BASIN PLANTING ATTACHMENT

William S. Graham and Frederick E. Hand, Canton, Ill., assignors to International Harvester Company, a corporation of New Jersey Application April 26, 1937, Serial No. 138,947

18 Claims. (Cl. 97—55)

This invention relates to basin forming attachments and is directed more particularly to basin forming implements of the type adapted for attachment to and operation in conjunction with lister plows and lister planters.

The main object of the invention is to provide an attachment for damming off lister furrows to prevent soil erosion by wind and water, and also to conserve the moisture from rains by preventing excessive run-off.

Another object of the invention is to provide means for transporting the basin attachment to and from the fields.

Another more specific object of the invention is to provide means for preventing the basin forming attachment from digging in at the end of rows, upon turning.

Still another object of the invention is to provide means for forming basins of various lengths and depths.

The foregoing, and other minor objects have been attained by providing a basin forming attachment having for its characteristic features of construction a longitudinal frame pivotally attached to the rear of a lister plow and planter attachment and trailed therefrom. The basin forming structure is such that separate attachments are provided for each lister plow or planter. The basin forming structure is supported on wheels provided with means for forming the dams at intervals, and the aforesaid means for forming the dams are so provided that the heights of the dams may be regulated and the length of the basins regulated. In addition, structure has been provided in one form for transporting the basin forming attachment to and from the fields, while in the other modification the means for transport is provided by supporting the dam forming attachment upon the frame of the lister plow or planter.

The invention accordingly resides in the organization and details of construction, or equivalents thereof, hereinafter more particularly described, and then defined in the claims.

Referring to the drawings:

Figure 1 is a side elevation of a lister planter with the basin forming attachment connected thereto;

Figure 2 is a rear elevation showing a dam forming disk and the means for gauging the disk and preventing the disk from gouging in at the ends of the rows;

Figure 3 is a side view showing the means for transporting the basin planting attachment;

Figure 4 is a rear view showing the means for transporting the basin forming attachment;

Figure 5 is an enlarged plan view taken along line 5—5 of Figure 1, looking in the direction of the arrows, of the means for hitching the basin forming attachment to the lister planter;

Figure 6 is a side view of a modification of the basin forming attachment in ground engaging and in transport position;

Figure 7 is a side elevation of the basin forming attachment shown in Figure 6 attached to a different type of lister planter shown in Figure 6; and, Figure 8 is an enlarged plan view of the draft connection of the basin forming attachment shown in Figure 6.

In the present instance, the invention is illustrated as including a lister plow or planter attachment of any well known type, with which the basin forming attachment is used in combination.

A lister planter 10, as shown in Figure 1, has a transverse angle iron frame 11, to which is connected an axle structure 12. Wheels 13 are mounted on the axle structure 12 and the right wheel carries a half-revolution clutch 14 for raising and lowering the lister planter attachment from ground engaging to transport position, providing means for adjusting the implement frame vertically. A lever 15 is adjusted about a quadrant 16 for adjusting the planter in its ground engaging position, as shown in Figure 1. The half-revolution clutch type of lift 14 is connected to the adjusting lever 15 by means of a rock-shaft 17 and link, in a well known manner. A planter attachment 18 is mounted on a longitudinally extending beam 19, which carries at its lower end a lister plow bottom 20. A furrow opening device or tool 21 is mounted to the rear of the beam 19 by a bracket 22, which also carries a support for a seed tube 23, which distributes the seeds from the planter hopper 18' to the furrow formed by the furrow opening device 21. The planter attachment is driven from the wheel 13 by means of a chain 24 driving a sprocket 25 mounted on the axle structure 12. The sprocket 25 in turn drives the planter drive mechanism by means of a chain 26 and a sprocket 27, which is secured to a shaft 28, which in turn drives the seed plates of the hopper in a well known manner.

The tractor lister plow and planter attachment which has just been described is operated from the tractor by means of the adjusting lever 15 for adjusting the depth of the planter attachment. For actuating the power lift clutch 14, a rope is pulled in the well known manner, allowing the wheel 13, as it travels forwardly, to lift the lister. The structure of the lister plow and planter may be considered broadly as an implement frame having a furrow forming tool.

A basin or dam-forming attachment 29 is trailed from the lister planter to the rear of the planter, as best shown in Figure 1, to form a succession of basins interposed by dams in the furrow left by the lister bottom 20. The basin forming attachment 29 comprises a longitudinally extending beam portion 30, which is supported by axle brackets 31 on an axle 32, which has spiked wheels 33 keyed thereon. The wheels and beam portion may be considered as a longitudinally extending wheel supported frame pivotally connected to the above mentioned implement frame for vertical movement. The wheels 33 are formed by a circumferential rim portion 34, to which spiked spokes 35 are attached, extending radially outwardly from the rim 34. The spokes, at their inner ends, are secured to a hub 36, which in turn is keyed to the shaft 32.

In order to raise and lower the basin forming attachment 29 to form a succession of dams in the furrow left by the lister bottom 20, a plurality of cam-shaped shoes, or cam-shaped means, 37 are mounted, as in Figure 1, diametrically opposite each other, providing means for forming successive dams in the aforesaid furrow by vertically actuating a basin forming means, such as a blade, which will be described later. The cam-shaped shoes 37 have a pointed portion 38 adapted to engage the ground, as shown in Figure 1, whereupon the wheels 33 are raised on a cam-shaped surface 39 as the basin forming attachment is drawn forwardly. As the attachment is drawn forward, the basin forming attachment is raised vertically an amount equal to the radial distance between the cam-shaped surface 39 and the radius of the wheels 33. Adjustment for changing the height of the dams is provided by adjusting holes 40 in the support 37' from the cam-shaped shoes. The aforesaid structure may be considered as transporting means adapted to follow the furrow left by the furrow forming tool and adapted to form a succession of dams.

It is obvious that as both wheels 33, as best shown in Figure 4, are keyed to the axle 32 the cam-shaped shoes 37 are also in alignment. It is apparent that, as the dam forming attachment travels forwardly from the position shown in Figure 1, a dam is formed; and, as the basin forming attachment drops from its position on the cam-shaped surface 39 as the wheels move forwardly in the furrow, a basin is formed between another dam formed as the opposite cam-shaped shoe engages the ground, as previously described. The length of the basins formed between the successive dams is substantially equal to the length of the circumference of the spiked wheels 33 between the dam forming or cam-shaped shoe members 37. It is also obvious that the length of the dams may be increased or decreased by changing the sizes of the wheels, or by adding to the number of dam forming members mounted on the wheel, or by removing one of the same in the specific machine illustrated in Figure 1. The length of the basins may be adjusted from substantially five and one-half feet in length to ten feet in length, depending upon whether a succession of short or long basins is required.

As best shown in Figures 1, 3 and 5, the forward end of the longitudinally extending beam 30 is attached to the lister planter by means of a V-shaped caster yoke 41, which in turn is pivotally connected to a caster yoke bracket 42 secured to the beam 19 of the lister planter attachment by means of bolts 43, which secure a bracket 44 for supporting the planter attachment 18. The caster yoke bracket 42 extends rearwardly from the beam 19 from a front portion, which is curved to the shape of the beam 19. Welded or otherwise secured to the yoke bracket 42 is a draft pin 45. The caster yoke 41 is pivoted on the draft pin 45 by a bearing portion 46, which is welded or otherwise secured to the apex of the V-shaped yoke 41, as best shown in Figure 5. Connecting the beam 30 with the caster yoke 41 are adjustable draft connections or draft means 47 pivotally connected to the wheel supported frame of the lister planter attachment. The forward ends of the draft connections 47 are secured to the caster yoke 41 by means of a transverse draft pin 48 mounted in the rear ends of the V-shaped yoke 41. Spacers 49 (Figure 5) center the draft connections 47 on the yoke bracket 41. At their ends, the draft connections 47 are adjustably secured to the beam 30 by means of adjusting holes 50. The position of the beam 30 may be adjusted vertically about the axle 32 in order to control the vertical depth of the basins. It is obvious, as shown in Figure 1, that, by changing the bolts 51 so that they are mounted in the holes which are shown, the position of the beam 30 may be adjusted vertically to various positions and provide means adapted for adjusting said wheel supported frame with respect to said draft means. The above structure provides means for hitching the longitudinally extending frame of the basin forming attachment to the implement frame.

A disk scraper blade 52 in the form of a concavo-convex disc having a cutting edge about its perimeter, as best shown in Figures 1 and 2, is mounted at the rear of the beam 30 by means of an adjusting bracket, or supporting means, 53 pivoted at 54, and is held in adjusted position by means of a bolt and slot adjustment 55. The adjusting bracket 53 is formed by a plurality of plate members 56, which are spaced apart by the beam 30, forming a slot through which a bolt 57 is mounted for securing the scraper blade 52 to the bracket 53. By means of the slot formed in the bracket 53, the position of the disk scraper blade may be adjusted vertically on the bracket in addition to the angular adjustment provided by the slot adjustment 55 for adjusting the pitch or tilt of the disk. Adjustably mounted on the rear of the adjusting bracket 53 is a gauge shoe, or gauge means, 58, as best shown in Figures 1 and 2, which may be considered as means secured to the longitudinally extending frame adjacent the rim of said basin forming blade for limiting the depth of penetration of said blade. The gauge shoe has a slotted supporting member 59 for attaching the gauge shoe to the bracket 53, and the bracket 59 is welded or otherwise secured to a U-shaped gauge portion 60, which has laterally spaced runner portions 61 formed by the legs of the gauge member adapted to straddle the ridge left by the notched portion of the basin forming blade.

As best shown in Figures 1 and 2, the disk scraper blade 52 is shaped so that it has cutting edges 62 along a chord of the disk substantially less than the diameter of the disk, which are sharpened, as shown, and are shaped to scrape the furrow left by the lister bottom 20 to the shape as shown in Figure 2. The disk scraper blade has been provided with four scraper edges 62, so that, as one edge is worn, the disk may be turned to use another edge. Each scraper edge 62 has a notched portion 63, as best shown in Figure 2, providing means for forming a ridge 64 down the length of each basin. The ridge 64 is formed to provide a covering for seeds 65, as best shown in Figure 2, dropped by the planter attachment. With the form of disk shown, the seeds may be deposited by the planter and left covered as the basin forming attachment forms dams at spaced intervals in the furrow. The gauge shoe 58 prevents the disk furrow scraper 52 from gouging as the lister planter attachment moves down the row. It also provides means, when the lister bottom 20 is raised for turning at the end of the row, for transporting the basin forming attachment on the runner 61, so that the disk scraper blade will not gouge in as the planter attachment is turned to return across the field in the opposite direction.

In Figures 1, 3 and 4 are shown the means for transporting the basin forming attachment. As shown in Figure 1, a transport attachment, or transport means, 66 is in its raised position while the basin forming attachment is forming the dams; but, in Figure 3, the transport attachment 66 is shown for transporting the basin forming attachment, providing means associated with said basin forming attachment whereby it may be supported in transport position. The transport attachment comprises two supporting members, or vertically movable supporting means, 67 and 68. The supporting members 67 and 68 are adjustably mounted on the beam 30 by means of a slot 69 formed in the members, and they are held in their adjusted position by means of a clamp 70, providing clamping means for securing said supporting means to said longitudinally extending frame in either of its positions. A transport wheel, or ground engaging means, 71 is journaled between the members 67 and 68, as best shown in Figures 3 and 4. Latch members 72 on each of the members 67 and 68 engage the disk, as best shown in Figures 3 and 4, in order to attach the transport attachment to the basin attachment.

In order to transport the basin attachment, the transport attachment 66 is shown in Figure 1 in its raised position and held in place by a chain 73 secured to the axle bracket 31. The chain 73 may be considered as means adapted to engage said supporting means 67 and 68 for supporting said transport means in its raised or non-engaging position. The clamp 70 is loosened and the beam is then raised by the operator and permitted to slide in the slots 69 until the wheels 33 with their cam-shaped shoes 37 clear the ground, as best shown in Figure 3. The transport attachment 66 is then moved rearwardly and the disk scraper blade locked in notches 74 formed by the latched members 72, or means adapted to engage said basin forming blade. The clamp 70 is then secured and the basin planter attachment 29 is ready to be transported from one field to another. It is obvious that a simple transport attachment has been provided for transporting the basin planter.

In the modifications shown in Figures 6, 7 and 8, a basin planter attachment 75 having features similar to that previously described in Figures 1, 2, 3 and 4 is attached to the lister 10, which is the same as described in Figure 1. As the lister planter attachment 10 is the same as previously described, like reference characters will denote similar parts. Only the different constructions shown in the basin forming attachment for adjusting the position of the beam of the basin forming attachment 75 and for supporting the basin forming attachment on the lister planter attachment in its dotted line position, as shown in Figure 6, will be described. The basin forming attachment 75 is a modification of the one 10 previously described in Figure 1 and has smaller wheels 76, so that smaller basins may be formed, but the construction of the wheels themselves is the same as described in Figure 1. The adjustment of the scraper blade 52 vertically for forming different heights of dams is provided by adjusting holes 77 in axle brackets 78 instead of by the adjustable draft connections 47, as disclosed in Figure 1. The position of the wheels 76 with respect to the disk scraper blade 52 is provided for by means of adjusting holes 79 positioned longitudinally in the basin planter attachment draft beam 80. As shown in Figures 6 and 8, the planter attachment 10 has a caster yoke bracket 42 to which a caster yoke 81, similar in shape to the caster yoke 41, is attached. Draft members 82, as best shown in Figure 8, pivotally connect the caster yoke 81 with the beam 80. It is obvious that, with the pivotal connections shown in Figures 5 and 8, the basin planter attachments 29 and 75 are free to rise and fall vertically about the horizontal axis between the draft connections 47 and 82 to where they are pivoted on the caster yokes 41 and 81, respectively, and the dam forming attachments are free to follow the furrow left by the lister plow 20 because of the horizontal movement of the basin planter attachments about the vertical axis formed by the pivotal connection between the caster yokes 41 and 81 and the yoke brackets 42.

In transporting the basin forming attachment 75, as shown in the dotted line position in Figure 6, the basin forming attachment 75 is raised vertically about its pivoted connection between the beam 80 and the caster yoke 81 to its dotted line position. The basin forming attachment is then secured in its transport position by means of transport braces 83, which are pivoted at their lower ends to a transport bracket 83' secured to the frame 11 of the planter, providing means associated with said basin forming attachment whereby it may be supported in transport position. The transport braces 83 are secured at their upper ends by a removable pin to a hole 84 in the axle bracket 78. It is, therefore, obvious that the basin planter attachment is held securely in its transport position, as shown in the dotted lines of Figure 6.

In Figure 7, the basin planting attachment 75 is shown attached to a lister planter 85 of a somewhat different type. In this modification, the basin forming attachment is attached to the covering attachment frame 86. This covering attachment frame 86 is pivoted at its forward end to the lister planter 10. Covering wheels 87 are carried by a caster axle member 88, which is pivoted in a bracket 89 secured to a transverse covering attachment frame 90. This type of covering attachment frame is used with a two-row lister planter attachment, and the covering wheels 87 are free to follow in the furrow left by the lister bottom 20 to cover the seed deposited by the planter attachment. The basin forming attachment 75 is attached to the covering frame attachment 85 by a caster yoke bracket 91 secured to the transverse member 90. A caster yoke 92 is pivotally connected for horizontal movement about a vertical axis to the yoke bracket 91, as previously disclosed in Figures 5 and 8. A beam 93 is pivotally secured at its forward end to the yoke 92 by means of draft members 94. As shown in its dotted line position, the basin forming attachment 75 is supported in its transport position by means of pivoted transport braces 95 pivotally mounted at their forward ends to the beam 19 of the lister planter 10. The transport braces 95 are secured at their upper ends in the same manner as described for the braces 83 to the axle bracket 78.

From the foregoing description of the several modifications of the basin forming attachment, it is apparent that a simple structure has been disclosed for forming successive basins and interposed dams in a lister furrow. Means has also been provided for adjusting the depth in which the blade will scrape the furrow left by the lister plow, and also provision has been made for forming dams of various heights in the furrow. In addition, means has been provided for preventing the disk scraper blade from gouging when the lister planter and basin forming attachment is turned at the ends of the row. Also, various means have been disclosed for transporting the basin forming attachment. Furthermore, structure has been provided for the basin attachment to provide for free pivotal movement about a horizontal and vertical axis in the connection between the lister planter attachment and the basin forming attachment. Likewise, a simple structure has been provided by notching the disk scraper blade to cover the seed planted by the lister planter. It is also apparent that the basin forming attachment may be used alone or in combination with other types of tools wherein basins and interposed dams are desired.

While the construction above described exemplifies a preferred form of the invention with several modifications for transporting the basin forming attachment, it will be obvious to those skilled in the art that certain other modifications in this structure are possible without departing from the scope of the invention as defined in the following claims.

What is claimed is:

1. A basin forming blade for a basin forming attachment comprising a concavo-convex disk having a cutting edge about its perimeter, and the cutting edge for forming the bottom of a basin being along a chord of the disk substantially less than the diameter of the disk.

2. A basin forming blade for a basin forming attachment comprising a concavo-convex disk having a cutting edge about its perimeter, the cutting edge for forming the bottom of a basin being along a chord of the disk substantially less than the diameter of the disk, and a notched portion at substantially the center of the cutting edge for forming the bottom of the basin whereby a ridge may be left at the bottom of the basin.

3. A basin forming blade for a basin forming attachment comprising a concavo-convex disk having a cutting edge about its perimeter, a plurality of cutting edges adapted for forming the bottom of a basin, each of said last mentioned cutting edges being along a chord of the disk substantially less than the diameter of the disk, and said last mentioned cutting edges being angularly disposed with respect to each other about the circumference of the disk whereby only one cutting edge may be used at a time.

4. In a basin forming blade as set forth in claim 3 comprising notches formed in each of said cutting edges whereby a ridge may be formed at the bottom of the basin when any of the aforesaid cutting edges is used.

5. The combination with an implement frame having a furrow forming tool, means for raising and lowering the implement frame with respect to the ground, of a basin forming attachment comprising a longitudinally extending wheel supported frame pivotally connected to the aforesaid implement frame for vertical movement, a basin forming blade supported on the aforesaid longitudinally extending frame, means secured to the longitudinally extending frame adjacent the rear of said basin forming blade for limiting the depth of penetration of said blade, said depth means serving also to support the entire basin attachment when elevated by the raising means upon lifting the implement frame upon making turns with the implement and attachment at the end of the furrow to thereby prevent gouging of the blade.

6. The combination with an implement frame having a furrow forming tool, of a basin forming attachment attached to the aforesaid frame and adapted to follow the furrow left by the furrow forming tool, said attachment comprising a basin forming blade, and means carried by said basin forming attachment and adapted to contact the ground whereby it may be supported in transport position.

7. The combination with an implement frame having a furrow forming tool, of a basin forming attachment attached to the aforesaid frame for vertical movement and adapted for transport, said attachment comprising a longitudinally extending wheel supported frame pivotally connected to the aforesaid implement frame for vertical movement and a basin forming blade mounted on said longitudinally extending frame, and transport means adapted to engage said basin forming blade whereby the aforesaid basin forming attachment may be transported.

8. The combination with an implement frame having a furrow forming tool, of a basin forming device attached to the aforesaid frame for vertical movement and adapted for transport, said device comprising a longitudinally extending wheel supported frame pivotally connected to the aforesaid implement frame for vertical movement and a basin forming blade mounted on said longitudinally extending frame, transport means adapted for transporting said basin forming device comprising vertically movable supporting means and ground engaging means mounted on said supporting means, and means adapted to engage said basin forming blade secured to said supporting means whereby the transport means is held in transport position.

9. The combination with an implement frame having a furrow forming tool, of a basin forming attachment attached to the aforesaid frame for vertical movement and adapted for transport and for ground engaging positions, said attachment comprising a longitudinally extending wheel supported frame pivotally connected to the aforesaid implement frame for vertical movement and a basin forming blade mounted on said longitudinally extending frame, and transport means adapted to be positioned either for transporting said basin forming attachment or for allowing said basin forming attachment to be placed in ground engaging position, said transport means comprising vertically movable supporting means mounted on said longitudinally extending frame, means adapted to engage said basin forming blade and secured to said supporting means, means adapted to engage said supporting means for supporting said transport means in the ground engaging position of said basin forming attachment, and clamping means for securing said supporting means to said longitudinally extending frame in either of its positions.

10. The combination with an implement frame having a furrow forming tool, of a basin forming attachment attached to the aforesaid frame and adapted for vertical movement, said attachment comprising a basin forming blade and gauge means adapted to follow the furrow left by the furrow forming tool and adapted to form a succession of dams, and transport means carried by said basin forming attachment whereby the basin forming blade and gauge means are wholly supported out of engagement with the ground in transport position.

11. The combination with an implement frame having a furrow forming tool, of a basin forming attachment adapted to follow the furrow left by the furrow forming tool, said attachment comprising a longitudinally extending wheel supported frame, a basin forming blade mounted at the rear of said wheel supported frame, means for hitching said longitudinally extending wheel supported frame to said implement frame, said last mentioned means comprising draft means pivotally connected to said wheel supported frame, and means adapted for adjusting said wheel supported frame about its wheels and with respect to said draft means to regulate the working depth of said basin forming blade.

12. A basin forming attachment comprising a a longitudinally extending wheel supported frame, a basin forming blade mounted at the rear of said frame and having a notched portion for forming a ridge at the bottom of a basin formed by said blade, supporting means mounted on said frame for supporting said blade, gauge means adjustably mounted on said supporting means for adjusting the depth of penetration of said blade, and said gauge means comprising runner portions adapted to straddle the aforesaid ridge left by the notched portion of the basin forming blade.

13. A basin-forming attachment comprising a support frame, a basin-forming blade mounted on said frame and having a notched portion for forming a ridge at the bottom of the basin formed by the blade, and gauge means for adjusting the depth of penetration of the blade adapted to run in the basin in parts thereof other than on the ridge formed therein.

14. A basin-forming attachment comprising a support frame, a basin-forming blade mounted on said frame and having a notched portion for forming a ridge at the bottom of the basin formed by the blade, and gauge means associated with the blade for adjusting the depth of penetration thereof and comprising runner portions adapted to straddle the ridge left by the notched portion of the basin-forming blade.

15. A basin-forming attachment comprising a support frame, a basin-forming blade mounted on said frame and having a notched portion for forming a ridge at the bottom of the basin formed by the blade and gauge means associated with the blade for adjusting the depth of penetration thereof and comprising a bracket means, a U-shaped member shaped at the bottom of the U thereof to provide a point of connection of the same to the bracket member and to provide runner portions of the legs of the U.

16. A basin forming blade for a basin-forming attachment comprising a disk having a cutting edge about its perimeter, and the cutting edge for forming the bottom of a basin being along a chord of the disk substantially less than the diameter of the disk.

17. A basin forming blade for a basin-forming attachment comprising a disk having a cutting edge about its perimeter, the cutting edge for forming the bottom of a basin being along a chord of the disk substantially less than the diameter of the disk, and a notched portion at substantially the center of the cutting edge for forming the bottom of the basin whereby a ridge may be left at the bottom of the basin.

18. The combination with an implement frame having a furrow forming tool, of a basin forming attachment attached to the aforesaid frame for vertical movement and adapted for transport and for ground engaging positions, said attachment comprising a longitudinally extending wheel supported frame pivotally connected to the aforesaid implement frame for vertical movement and a basin forming blade mounted on said longitudinally extending frame, and transport means adapted to be positioned either for transporting said basin forming attachment or for allowing said basin forming attachment to be placed in ground engaging position.

WILLIAM S. GRAHAM.
FREDERICK E. HAND.